June 26, 1956  H. E. LEMONT, JR., ET AL  2,751,988
BLADE FOR AIRCRAFT AND MANUFACTURE THEREOF
Filed June 3, 1952  3 Sheets-Sheet 1

INVENTORS.
HAROLD E. LEMONT, Jr.
BY & ALEXANDRE BERGER

Busser, Smith + Harding
ATTORNEYS

June 26, 1956  H. E. LEMONT, JR., ET AL  2,751,988
BLADE FOR AIRCRAFT AND MANUFACTURE THEREOF
Filed June 3, 1952  3 Sheets-Sheet 2

INVENTORS.
HAROLD E. LEMONT, Jr.
& ALEXANDRE BERGER
BY
ATTORNEYS

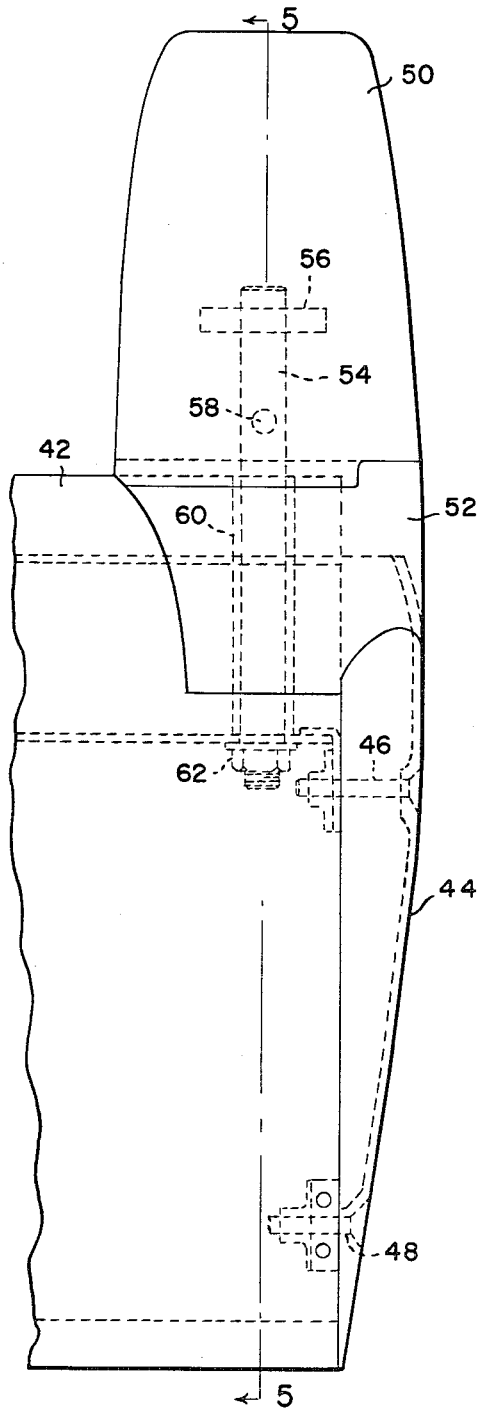
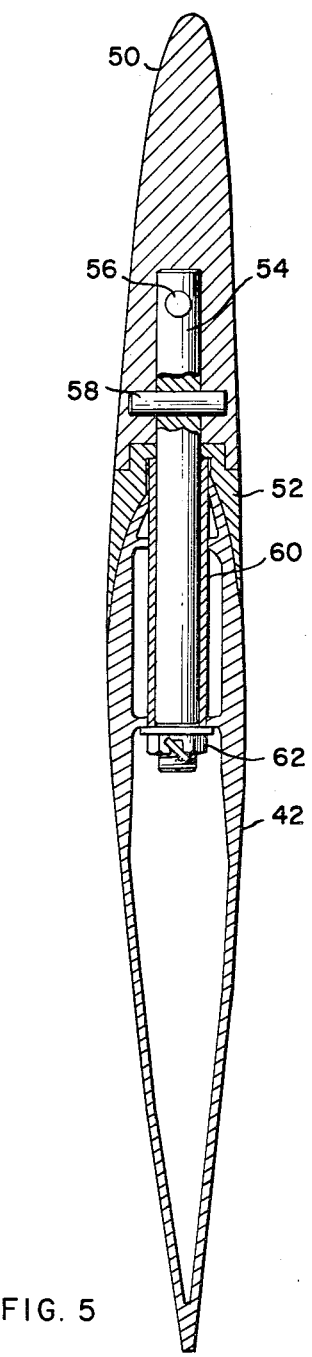
FIG. 4.
FIG. 5.
INVENTOR.
HAROLD E. LEMONT, Jr.
& ALEXANDRE BERGER
BY
ATTORNEYS United States Patent Office 2,751,988
Patented June 26, 1956

2,751,988

BLADE FOR AIRCRAFT AND MANUFACTURE THEREOF

Harold E. Lemont, Jr., and Alexandre Berger, Pottstown, Pa., assignors to Jacobs Aircraft Engine Company, Pottstown, Pa., a corporation of Pennsylvania Application June 3, 1952, Serial No. 291,452

5 Claims. (Cl. 170—159)

This invention relates to blades for aircraft and the manufacture thereof, and has particular reference to the manufacture of large blades such as constitute the main rotor of a helicopter. As will be evident, however, the invention is also applicable to blades for other uses such as for propellers.

The primary object of the invention relates to the provision of blades of one-piece type, except for tip and hub elements. The invention particularly relates to the manufacture of one-piece extruded blades of aluminum alloy or the like, which blades contain integral extruded stiffening webs. Blades in accordance with the present invention may be manufactured to close tolerances of both dimensions and weights and, consequently, may be replaceable, one for another, without special matching of the blades which may be associated in a single rotor.

Detailed objects of the invention particularly relating to matters of construction and steps of manufacture will be apparent from the following description read in conjunction with the accompanying drawings, in which:

Figure 4 is a plan view showing the tip of a blade provided with a balancing weight extending forwardly of the leading edge of a blade; and Figure 5 is a section on the plane indicated at 5—5 in Figure 4.

Figure 2:
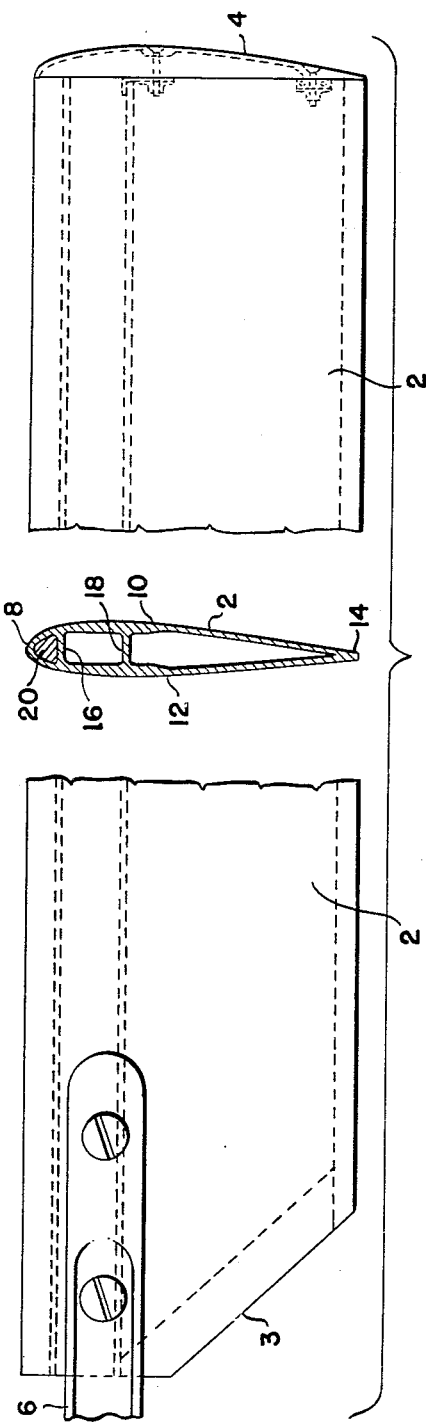
Figure 2 is a composite view showing in plan the tip and hub ends of a blade together with a chordwise section thereof.

Referring first to Figure 2, the blade indicated therein comprises the main portion 2 of uniform cross-section, to which portion the methods of manufacture hereafter described particularly relate. The portion 2 is indicated as bevelled at 3 at its root end and associated with a conventionally shaped rounded tip indicated at 4. Where the portion 2 is bevelled at 3 the hollow interior may be closed by an insert welded, bonded, riveted or bolted in place. At its root end it is connected to the supporting arm 6.

Figure 3:
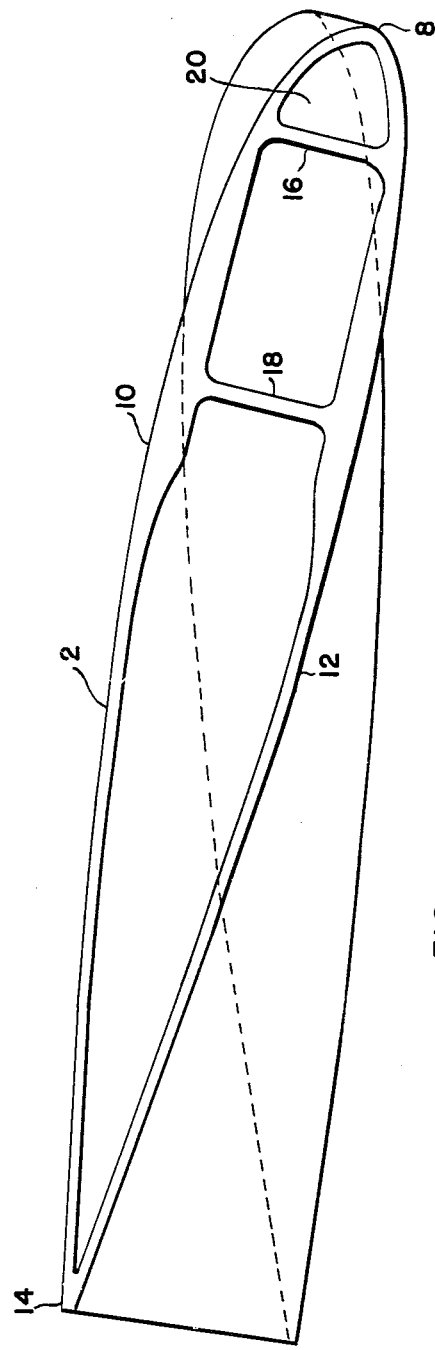
Figure 3 is an end elevation showing a blade blank which has been twisted to the final desired shape.

The profile-section of the main blade portion 2 may have a conventional exterior airfoil contour as indicated in the section in Figure 2 and in Figure 3. This involves the rounded leading edge 8, the upper and lower surfaces 10 and 12, respectively, and the trailing edge 14. The profile and chord length are uniform throughout the length of the blade portion 2.

Considering specifically blades for helicopter rotors, the length of the main portion 2 may, for example, be of the order of 16 feet while the chord may be of the order of 10 inches, with the maximum thickness about 1½ inches. To secure rigidity in such a structure there are provided in accordance with the present invention longitudinally extending integral webs 16 and 18. The former forms with the rounded leading edge a hollow chamber which, to secure proper balance, may be uniformly or non-uniformly, as desired, filled with lead or other heavy weighting material. This is indicated at 20. The weighting material may, however, be omitted if external balancing weight is provided as hereafter described.

The main blade portion is twisted about its longitudinal axis as indicated particularly in Figure 3. This twist in the case of a helicopter rotor blade of the type referred to may be of the order of 7° overall.

In accordance with the invention the blade portion 2 is formed by extrusion of a suitable alloy, for example, aluminum alloy 61S, though other alloys may, of course, be used, including non-aluminum alloys. Extrusion of the metal to the final shape directly is impractical consistent with the maintenance of the desirable small wall thicknesses required for minimum weight when the blade has a large chord such as previously mentioned. It has been found, however, that the desired blade portion may be provided by first extruding a blank of different section followed by the reshaping of this blank, without further drawing, in a suitable sink die. The procedure involved in a practical method of formation of a blade portion will now be described.

Figure 1:
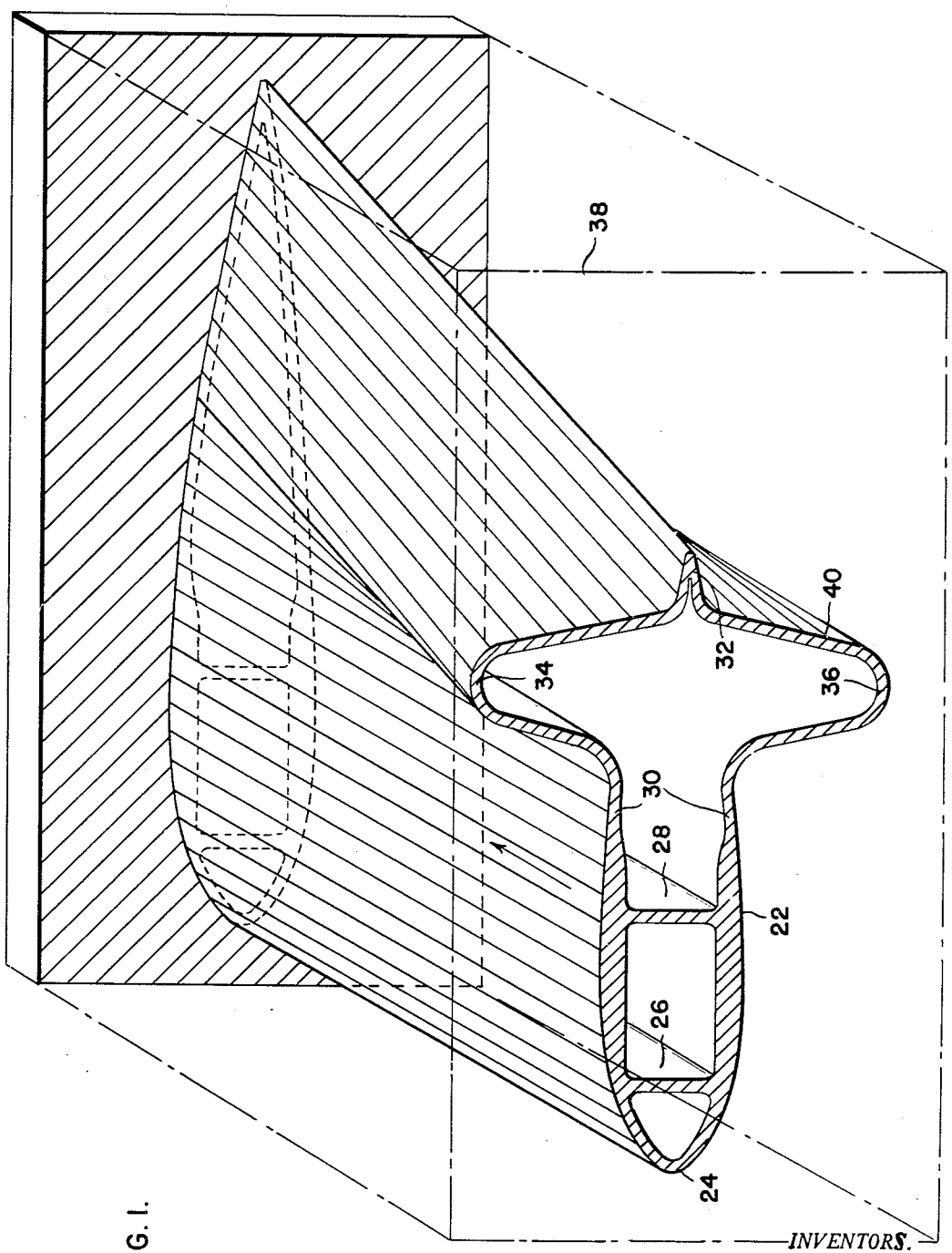
Figure 1 is a perspective view illustrating in particular the drawing of a blade blank from an extruded blank in a die which is illustrated primarily in phantom form.

Referring now to Figure 1, there is indicated at 22 the section of a blank which may be extruded in accordance with conventional procedures. Extrusion from the original alloy billet at room temperatures or moderately elevated temperatures may produce this blank 22 which comprises a nose portion 24, longitudinally extending webs 26 and 28 and portions indicated at 30 to the rear of the web 28. To the extent of the cross-section of this blank so far described, i. e. from the leading edge 24 to the portions 30 somewhat beyond the region of maximum chord thickness, the cross-section is identical with the final cross-section of the leading portion of the final blade portion. In other words, the contour of the nose 24 is the same as nose 8, webs 26 and 28 correspond respectively to the webs 16 and 18 and have the same dimensions and the same is true of the outer contour from the nose through the portions 30. Beyond the portions 30, however, the blank 22 bulges upwardly and downwardly at 34 and 36 and then terminates at its rear edge in an edge portion 32 which has the same contour and dimensions as the trailing edge 14 of the blade portion 2. The wall thicknesses at 34 and 36 are essentially the same as in the final blade portion and the cross-sectional exterior contours have the same perimeter as the corresponding cross-sectional exterior contours of the final blade portion. Stated generally, this means that in passing from the extruded blank to the final blade portion the metal is not subjected to any appreciable extruding action but is merely bent to the final shape with only such minor distortion of elemental sections as is incident to such bending.

The extruded blank 22 is brought to its final shape by passage either under pushing or pulling action through a sink die which is diagrammatically indicated at 38 in Figure 1, primarily in phantom form. The passage 40 through this die has a varying contour which at its receiving end corresponds to the extruded blank 22 and at its discharge end corresponds in contour to the final shape of the blade portion. The deviations between the ends of this passage are such as to press inwardly and at the same time displace toward the right as viewed in Figure 1 the bulges 34 and 36 of the extruded blank. The trailing edge 32 concurrently is guided toward the right relatively to the nose portion 24. The passage through the die is of uniform contour adjacent to the forward portion of the blank so that the nose portion 24, webs 26 and 28, and the upper and lower portions of the airfoil section extending through the portions 30 pass through the die without distortion to become the corresponding portions of the final blade form. The general progress of the extruded blank through the die will be evident from the line shading Figure 1 which indicates generally the paths taken by any point on the contour of the extruded blank in passing to the final blade form.

The blanks which are extruded and which are forced through the sink die may be of any convenient length such as, for example, that of four or five of the final main blade portions to be produced. The blank blade strip is accordingly transversely cut to the desired final lengths.

After passage through die 38, while the desired cross-section will have been produced, the blank will always be considerably distorted out of longitudinal straightness and also twisted.

Straightening and the attainment of the desired final twist may be accomplished either before or after the final blank is cut into sections. For this purpose the uncut blank or the sections are filled completely with a low melting point alloy to give them solidity whereupon straightening and correction of twist to its final desired value may be accomplished in conventional fashion. The low melting alloy is then fused and removed.

The final step of loading the nose 20 is then carried out, the lead or other heavy material being introduced throughout the extent of the leading edge or non-uniformly as may be desired for proper balancing. Finally, the blade is completed by desired modifications of the ends of the main portion and assembly therewith of the tip and hub portions by welding, bolting, or in other suitable fashion.

Figures 4 and 5 show an alternative balancing arrangement provided, in particular, for adding balancing weight to the blade and arranged to replace either entirely or partially the weighting which may be provided as above described at 20.

Referring to Figures 4 and 5, 42 shows the tip end of a blade to which there is secured a tip section 44 securable in position by bolts 46 and 48. This tip section may be formed of aluminum alloy and is of hollow construction. A faired weight 50 of lead or other heavy metal is secured to the leading edge of the blade at its tip, there being provided between the weight 50 and the blade end tip 44 a fairing section 52 to provide an exterior smooth surface at the junctions of the parts. Bolt 54 provided with transverse pins 56 and 58 is cast in the weight 50 and projects through bores in the leading edge of the blade and the longitudinally extending webs, being surrounded by crusher tube 60 and secured in place by a nut 62. By a suitable choice of size, weight and position of the metal mass at 50, proper dynamic balance of the blade is secured. It may be noted that this mass need not necessarily be located at the tip of the blade but may be provided elsewhere along its leading edge as may be suitable for proper balancing action.

From the foregoing it will be evident that there is produced in simple fashion a blade, the major portion of which is of one piece, extruded construction involving in particular the ribs or webs 16 and 18 to provide longitudinal stiffness. As will be evident from the foregoing, blades of various airfoil contours may be provided as desired. By virtue of the fact that the blades are produced under conditions which make possible the maintenance of close tolerances of dimensions and weights, the final blades are sufficiently uniform to be replaceable, one for another, in rotor or propeller assemblies without the necessity for careful matching and tedious adjustments of balance and weight. As a result the cost of blades may be very considerably reduced.

What is claimed is:

1. The method of forming a hollow, one piece blade section of airfoil contour comprising producing by extrusion an elongated blank having a rounded leading edge portion of substantially the same contour as that of the blade section to be produced, having a stiffening web extending longitudinally through said leading edge portion, and having its chord substantially less than that of the blade section to be produced but with the perimeter of a transverse cross-section of the blank approximately equal to that of the blade section to be produced by reason of outward bulging of the trailing portions of the blank walls, and passing said blank through a die shaped to guide the leading edge portion of the blank without substantial distortion thereof but to flatten gradually the bulging portions of the blank walls, with concurrent increase of the chord, to the desired contour of the blade section.

2. The method of forming a hollow, one piece blade section of airfoil contour comprising producing by extrusion an elongated blank having a rounded leading edge portion of substantially the same contour as that of the blade section to be produced, and having its chord substantially less than that of the blade section to be produced but with the perimeter of a transverse cross-section of the blank approximately equal to that of the blade section to be produced by reason of outward bulging of the trailing portions of the blank walls, and passing said blank through a die shaped to guide the leading edge portion of the blank without substantial distortion thereof but to flatten gradually the bulging portions of the blank walls, with concurrent increase of the chord, to the desired contour of the blade section.

3. The method of forming a hollow, one piece blade section of airfoil contour comprising producing by extrusion an elongated blank of uniform contour throughout its length and having a uniform chord substantially less than that of the blade section to be produced but with the perimeter of a transverse cross-section of the blank approximately equal to that of the blade section to be produced by reason of outward bulging of its walls between the region of maximum chord thickness of the finished blade section and the trailing edge, and passing said blank through a die shaped to flatten gradually the bulging portions of the blank walls with concurrent increase of the chord, to the desired uniform chord and contour of the blade section.

4. The method of forming a hollow, one piece blade section of airfoil contour comprising producing by extrusion an elongated blank having an integral stiffening web extending longitudinally thereof in a portion adjacent the leading edge and having a chord substantially less than that of the blade section to be produced but with the perimeter of a transverse cross-section of the blank approximately equal to that of the blade section to be produced by reason of outward bulging of its walls between said stiffening web and the trailing edge of the blade section, and passing said blank through a die shaped to guide said leading edge and said adjacent portion stiffened by said web without substantial change in the contour thereof and to flatten gradually the bulging portions of the blank walls between said stiffened adjacent portion and the trailing edge of the blade, with concurrent increase of the chord, to the desired contour of the blade section.

5. A blade for aircraft comprising an elongated hollow blade section of airfoil contour and uniform chord throughout its length, and having at least one internal spanwise extending reinforcing web, a faired balancing weight having a rounded leading edge portion, a rod extending from the trailing edge of said balancing weight and through the leading edge and web of said blade section and secured thereto, and a fairing section interposed and clamped between said balancing weight and leading edge of said blade section.

References Cited in the file of this patent

UNITED STATES PATENTS

| | | |
|---|---|---|
| 1,461,866 | Dornier | July 17, 1923 |
| 1,518,410 | Reed | Dec. 9, 1924 |

(Other references on following page)

UNITED STATES PATENTS

| | | |
|---|---|---|
| 1,899,631 | Norton | Feb. 28, 1933 |
| 1,999,136 | Cierva | Apr. 23, 1935 |
| 2,161,699 | Cierva | June 6, 1939 |
| 2,270,398 | Westin | Jan. 20, 1942 |
| 2,293,801 | Caldwell | Aug. 25, 1942 |
| 2,394,445 | Handler | Feb. 5, 1946 |
| 2,460,351 | Hoffman et al. | Feb. 1, 1949 |
| 2,465,884 | Koppel | Mar. 29, 1949 |
| 2,469,480 | Sikorsky | May 10, 1949 |
| 2,493,139 | Heath | Jan. 3, 1950 |
| 2,512,264 | Brauchler | June 20, 1950 |
| 2,564,093 | Bijl | Aug. 14, 1951 |
| 2,574,651 | Meyers | Nov. 13, 1951 |
| 2,620,884 | Gluhareff | Dec. 9, 1952 |
| 2,633,978 | Brown | Apr. 7, 1953 |